United States Patent [19]
Krikorian et al.

[11] Patent Number: 5,113,194
[45] Date of Patent: May 12, 1992

[54] ACCELERATION COMPENSATION BY MATCHED FILTERING

[75] Inventors: Kapriel V. Krikorian, Agoura; Robert A. Rosen, Agoura Hills, both of Calif.

[73] Assignee: Hughes Aircraft Company, Los Angeles, Calif.

[21] Appl. No.: 574,614

[22] Filed: Aug. 29, 1990

[51] Int. Cl.⁵ .............................................. G01S 13/60
[52] U.S. Cl. ........................... 342/106; 342/189; 342/194; 342/196
[58] Field of Search ............... 342/106, 189, 192, 194, 342/196, 195, 159, 161, 162, 91, 92

[56] References Cited

U.S. PATENT DOCUMENTS

| | | | |
|---|---|---|---|
| 3,806,929 | 4/1974 | Moore | 342/192 X |
| 3,936,825 | 2/1976 | Jensen et al. | 342/106 |
| 4,138,677 | 2/1979 | Sinclair, Jr. | 342/106 |
| 4,148,029 | 4/1979 | Quesinberry | 342/106 |
| 4,786,906 | 11/1988 | Krogager | 342/196 X |

Primary Examiner—Tod Swann
Attorney, Agent, or Firm—Leonard A. Alkov; Wanda K. Denson-Low

[57] ABSTRACT

A radar processor is described which performs acceleration compensation for accelerating targets. A set of matched filters is formed that compensates for each one of a predetermined set of target accelerations. The matched filters optimize the signal-to-noise ratio by weighting and combining the Doppler filters over which the target is spreading. As a result, enhanced detection capability of maneuvering targets that spread their energy over Doppler filters is provided. Radar processor loading is reduced, thus making practical the implementation of long coherent arrays.

18 Claims, 4 Drawing Sheets

ACCELERATION COMPENSATION BY MATCHED FILTERING

BACKGROUND OF THE INVENTION

The present invention relates to radar processing and more particularly to a radar processor which provides enhanced detection of maneuvering targets that spread their energy over several Doppler filters.

To increase sensitivity at long ranges, or for weak targets, longer integration times may be employed. Energy is radiated over a relatively longer time in the direction of the target, and by integrating the radar return over a relatively longer time, the signal-to-noise ratio of the return signal can be improved. With the advanced processors available today, long integration times can be achieved. A combination of coherent and incoherent processing will typically be required to achieve target detection.

The received signal intensity can fluctuate as a result of target motion; such fluctuations are known as target scintillation. Target scintillation increases as the radar frequency of operation is increased. The coherent integration time is selected such that target scintillation does not reduce the sensitivity. Based on target scintillation data, coherent integration times of the order of one second are feasible.

However, for long coherent integration times, the energy of an accelerating target can spread over several Doppler filters. The number of filters over which the energy spreads is given approximately by:

$$N = 2a\, T^2/\lambda \qquad (1)$$

where a is the acceleration, T is the coherent array time, and $\lambda$ is the wavelength.

Table I shows the number of Doppler filters spread as a function of coherent array time for accelerations between $-0.1$ g and $+0.1$ g. As can be seen even for low accelerations, large spreadings may result.

TABLE I

| Target Spreading Due to Acceleration ($-0.1\text{ g} \leq a \leq +0.1\text{ g}$ and $\lambda = .14$ ft.) | |
|---|---|
| T (sec) | N (number of filters) |
| .22 | ±2.25 |
| .44 | ±9.00 |
| .66 | ±20.25 |

The signal-to-noise loss in the center filter as a function of the number of filters spread is shown in FIG. 1. The loss is with respect to a non-accelerating target and uniform amplitude weighting is assumed.

Large target accelerations and/or long coherent arrays can produce significant losses in target signal-to-noise ratio and degrade detection. One method which has heretofore been considered to compensate for accelerating targets is to apply a quadratic phase shift $\phi$ to the data before the Fast Fourier transform (FFT):

$$\phi = 2\pi(a/\lambda)(n/PRF)^2$$

where n is the sample number, a is the acceleration and PRF is the radar pulse repetition frequency.

A disadvantage of this method is that a separate FFT operation is required for each acceleration. This technique is impractical for large accelerations or long integration times because of high processor loading.

It would therefore represent an advance in the art to provide a radar processor which performs target acceleration compensation without high processor loading.

SUMMARY OF THE INVENTION

A radar processor is disclosed for compensating for target acceleration which comprises, for each range bin to be processed to provide target data, means for amplitude weighting the in-phase and quadrature components of the received radar signals, and means for transforming the amplitude weighted radar signals into the frequency domain. The processor further comprises means for forming a plurality of acceleration filters matched to a predetermined set of target accelerations to process the outputs of respective groups of Doppler filters over which the energy of an accelerating target has spread, wherein the combination weights for each acceleration filter are precomputed to optimize the signal-to-noise ratio for each predetermined acceleration. A means is provided for magnitude detecting the output of each filter bank and comparing the magnitude of the output to a predetermined threshold to determine whether a target has been detected.

Thus, a single FFT operation is performed for each range bin, and the frequency domain data is processed to perform matched filter detection of a discrete number of matched filters for particular acceleration and deceleration values. As a result the radar processor can employ long coherent integration times and provide direct measurements of target accelerations, and also improve tracking performance.

The invention is further characterized by a method for processing radar signals to compensate for target acceleration. The method incudes the following steps, performed for each range bin to be processed to provide target data: (i) amplitude weighting the in-phase and quadrature components of the received radar signals; (ii) transforming the amplitude weighted radar signals into the frequency domain; (iii) forming a plurality of filter banks matched to a predetermined set of target accelerations to process the transformed amplitude weighted signals, wherein the combination weights of each filter bank are precomputed to optimize the signal-to-noise ratio for each predetermined acceleration; and (iv) magnitude detecting the output of each filter bank and comparing the magnitude of the output to a predetermined threshold to determine whether a target has been detected with that particular acceleration.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Overview of the Invention

Figure 1:
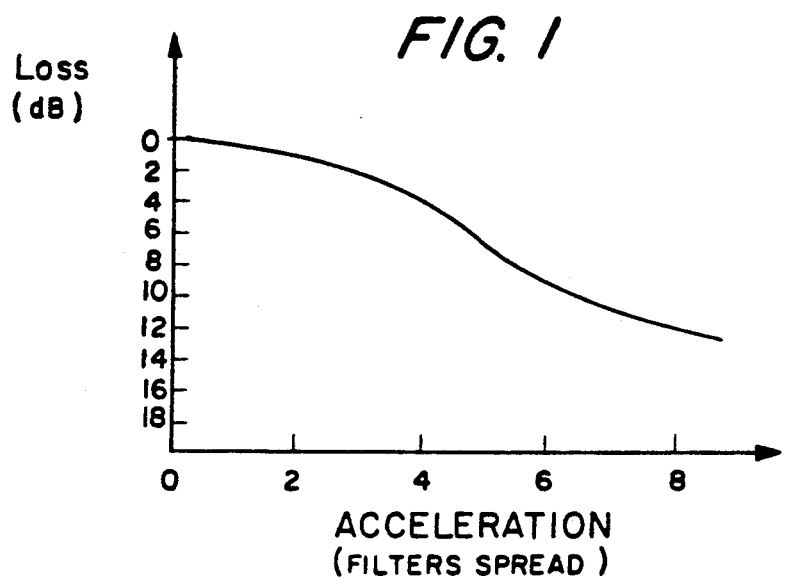
FIG. 1 is a graph illustrating the signal-to-noise loss due to target spreading as a function of the Doppler filter spreading.

In accordance with the invention, Doppler filters are combined to form "synthetic" filters matched to a predetermined set of target accelerations. The Doppler filter combination weights of each filter are precomputed and are chosen to optimize the signal-to-noise ratio (SNR) for each predetermined acceleration based on the co-variance matrix between filters The combination weights for an (N+1) filter acceleration are given by:

$$C_j = \sum_{i=0}^{N} (Q^{-1})_{ij} M_i^*$$

where $C_j$ is the $j^{th}$ filter weight; $M_i$ is the output of filter i for a signal centered at frequency N/2; Q is the co-variance matrix between filters being combined; and "*" denotes the complex conjugate.

A set of complex weights is sued for each acceleration. The same set of complex weights is used for all filters for a given acceleration.

The synthetic acceleration filter centered at FFT filter k is given by:

$$Y_k = \sum_{j=0}^{N} C_j X_{j-k-N/2} \quad (3)$$

where $X_i$ is the $i^{th}$ FFT filter output, and N is given by eq. 1. For the case where N is odd, N/2 will be rounded to the next higher integer value.

A set of Doppler filter banks is formed in the conventional manner from a Fast Fourier Transform (FFT) operation, say M filters, where M=25. If the target is not accelerating, the energy from the target would be in only one Doppler filter, e.g., filter 15. However, if the target is accelerating, the target return energy will be spread over N filters, where N is given by eq. 1 above. If, for a particular acceleration a, N=3 for example, then, in this example, the target return energy is spread over Doppler filters 14, 15, 16. Or if another target has a different velocity (in Doppler filter 20, for example), but the same acceleration, the return energy from this second target would be spread over Doppler filters 19, 20, 21.

In accordance with the invention, the Doppler filter bank outputs are processed to compensate for a discrete number of acceleration values. For each such acceleration value, the number of Doppler filters over which a target return will be spread is determined (eq. 1), and for the outputs of each Doppler filter, the outputs of N adjacent Doppler filters are weighted, using the combination weights of eq. 2. These weighted Doppler filter outputs are combined to provide the synthetic acceleration filter (centered at Doppler filter k) given by eq. 3.

The output of the synthetic acceleration filter can then be processed, e.g., by magnitude threshold detection, to determine if a target is present at that Doppler and with that particular acceleration a.

Figure 2A:
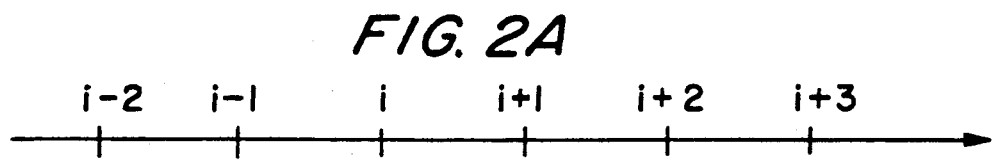
FIGS. 2A–2C provide a conceptual representation of matched acceleration filtering in accordance with the invention.
Figure 2B:
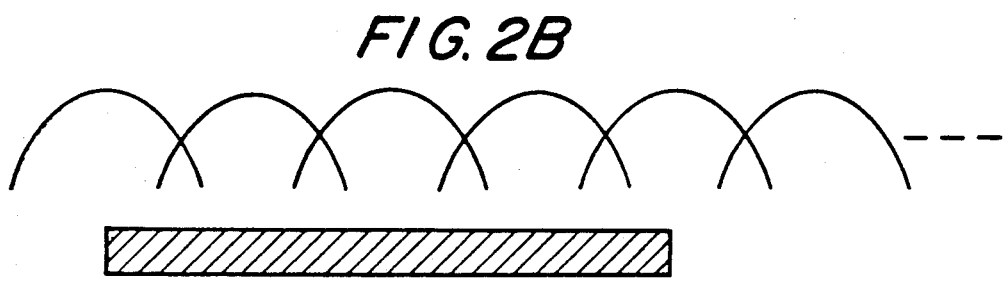
Figure 2C:
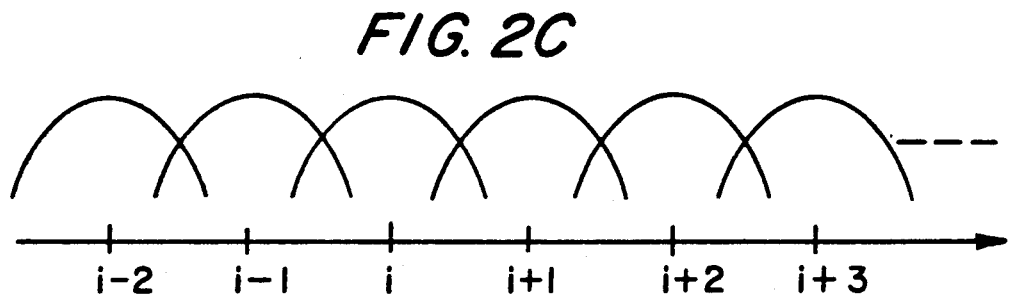

FIG. 2 gives a conceptual representation of matched acceleration filtering in accordance with the invention. The top line (FIG. 2A) gives the Doppler filter number, centered at i, each filter corresponding to a given Doppler frequency. FIG. 2B illustrates the finite impulse response of a bank of FFT filter outputs, X, matched to a target acceleration=0, which correspond to the Doppler filter numbers of FIG. 2A. If the target is not accelerating, all the return energy will be in single Doppler filter, say filter i. Now assume that the target is accelerating with a known (or assumed acceleration) a. This causes, over a long integration time, the target return energy to be spread over N filters, where N is given by eq. 1. Assume that, for this example, N=5. The energy spreading is indicated in FIG. 2A. In accordance with the invention, a bank of synthetic matched filters of output Y is formed with a finite impulse response as shown in FIG. 2C, matched to a target acceleration a corresponding to N=5. One synthetic filter matched to the acceleration a is formed for each Doppler filter number. Here, Y is given by:

$$Y_i = \sum_{j=1}^{5} C_j X_{i-j-3}$$

Where $Y_i$ is the matched acceleration filter output for an acceleration corresponding to N=5, $X_i$ is the FFT filter output at Doppler number i corresponding to zero acceleration, and $C_j$ is the matched filter combination weight, given by eq. 2. Typically, a discrete number of synthetic filters each matched to some acceleration value will be formed for each Doppler filter number.

This method can be used by itself or in conjunction with the conventional technique of employing a quadratic phase shift.

The Preferred Embodiment

Figure 3:
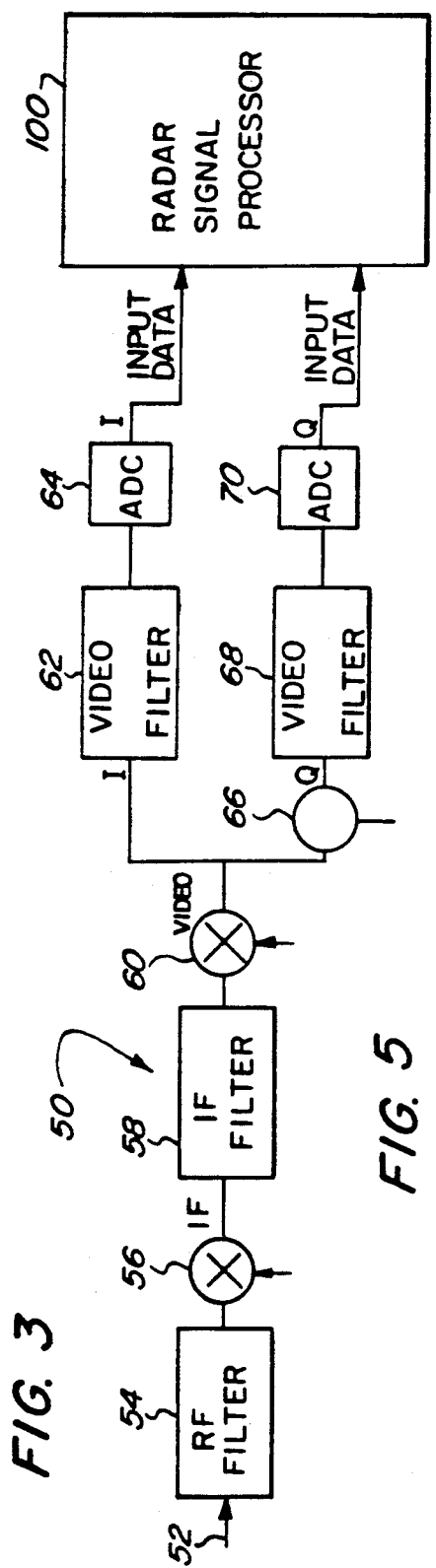
FIG. 3 is a simplified block diagram of a conventional radar receiver with which the present invention may be employed.

FIG. 3 is a simplified block diagram of a conventional radar receiver 50 with which the present invention may be advantageously employed. The radar signals are received at antenna 52, passed through RF filter 54, and downconverted to IF by mixer 56. The IF signals are passed through an IF filter 58, and then mixed down to baseband video by mixer 60. The IF signals are then split into the in-phase and quadrature channels. The in-phase channel comprises video lowpass filter 62 and analog-to-digital converter 64, with the resulting digital I data sent to the radar signal processor 100 for processing in accordance with the invention. The quadrature channel includes the 90 degree phase shifter 66 for shifting the video signal to obtain the quadrature Q signal, another lowpass video filter 68 and analog-to-digital converter 70, with the resulting digitized quadrature signals being sent to the radar signal processor 100.

Figure 4:
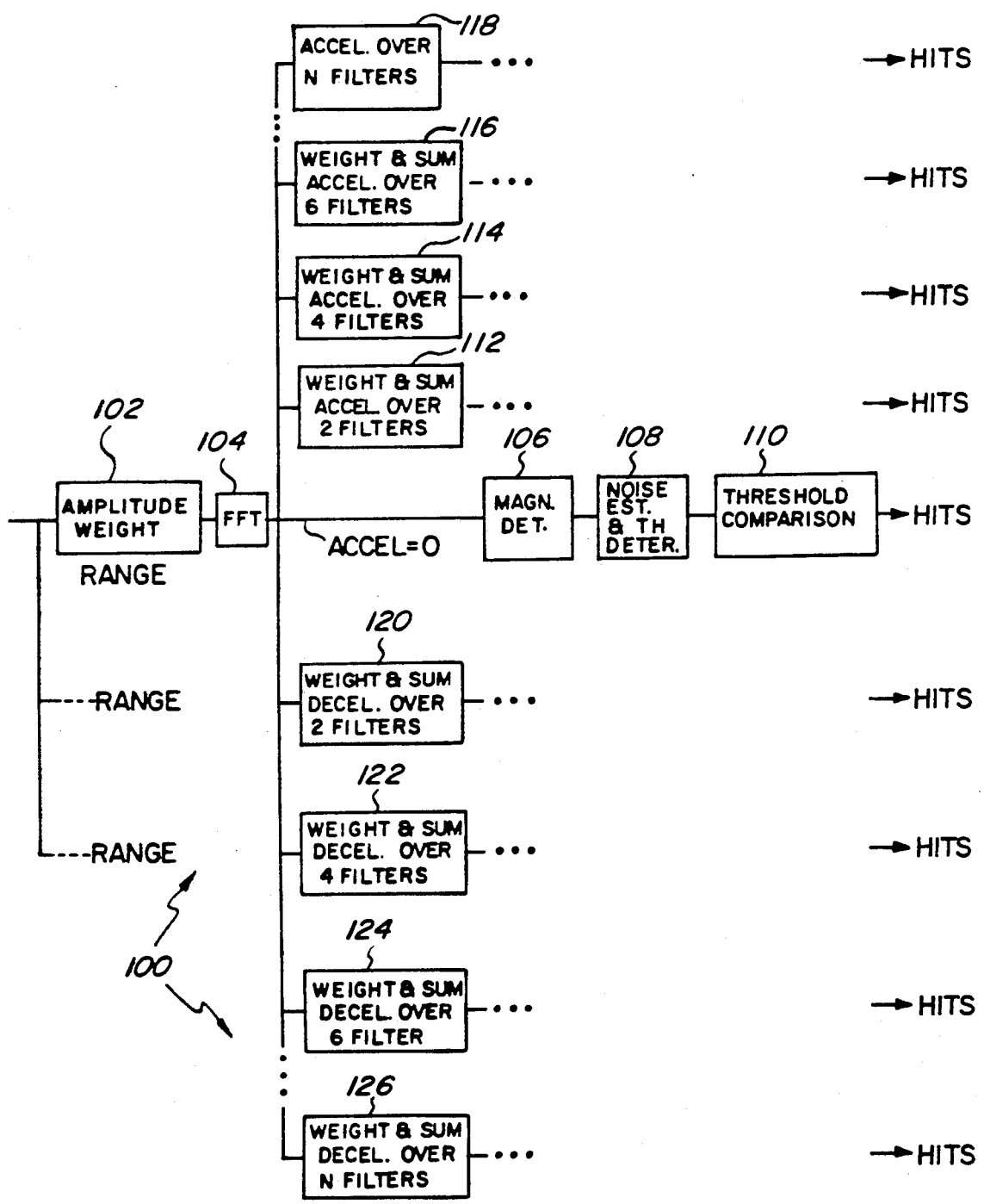
FIG. 4 is a simplified functional block diagram of a radar signal processor embodying the invention.

The radar signal processor 100 is illustrated in the simplified functional block diagram of FIG. 4. The I and Q components are combined in a complex word, and then processed in a single processing branch, using complex arithmetic, on the complex word. Thus, the complex input samples are amplitude weighted at 102, and the weighted samples are transformed into the frequency domain by Fast Fourier Transformer (FFT) 104 to form a set of Doppler filters. The outputs of the Doppler filters are then processed by matched filter detection by matched filters which are acceleration filters formed in the frequency domain, as described above in the Overview. For the case of a target which is not accelerating, the transformed signals are processed in the conventional manner by magnitude detection 106, and by noise estimation 108, i.e., to determine the amount of background noise to be multiplied by a threshold multiplier selected for a particular false alarm rate, to determine the particular threshold value. The magnitude resulting from the detection process 106 is then compared against the threshold amount (resulting from 108) at 110 to determine whether a target is present in a particular cell (each defined by range, Doppler filter number and acceleration dimension).

In accordance with the invention, the Doppler filter data is further processed by a plurality of synthetic acceleration filters, each corresponding to a particular acceleration value. Thus, at function 112, the FFT samples are weighted and summed for acceleration over two Doppler filters, with the resultant data processed in a manner identical to the zero acceleration case, i.e. by magnitude detection, estimation and threshold comparison (functions not shown for clarity in FIG. 4). The FFT data is similarly processed by matched filter detection for acceleration over four Doppler filters (114), over six filters (116) and so on for a predetermined number of discrete filters, up to matched filter detection over N Doppler filters (118).

In a similar fashion, the FFT signals are processed for deceleration over two Doppler filters (120), over four Doppler filters (122), over six Doppler filters (124) and so on, up to matched filter deceleration detection over N Doppler filters (126).

In accordance with the invention, one FFT operation is performed for each range bin, and the frequency domain data is processed to perform matched filter detection of a discrete number of matched filters for particular acceleration and deceleration values. As a result, the radar processor can employ long coherent integration times and provide direct measurements of target accelerations, and also improve tracking performance.

Figure 5:
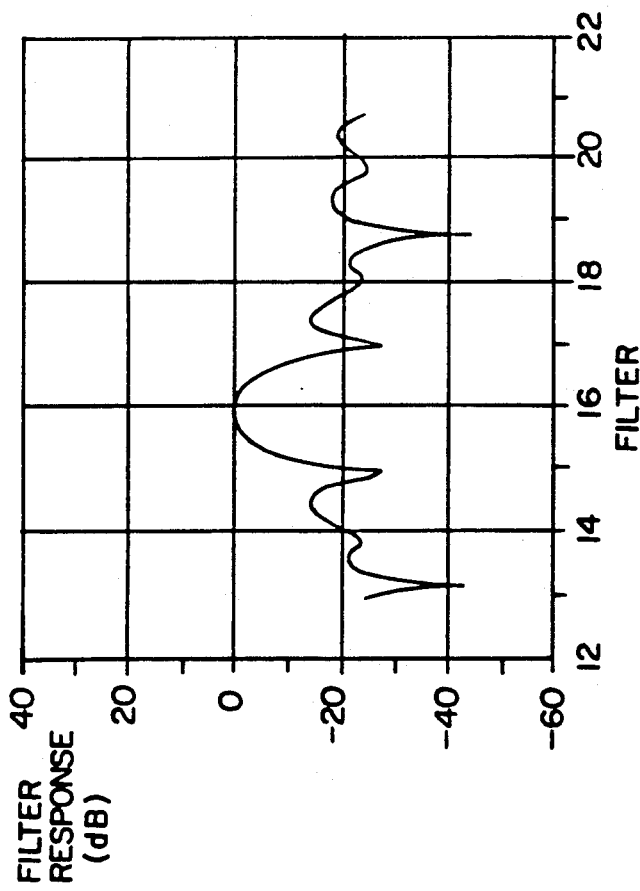
FIG. 5 shows the frequency response of a filter found by optimally combining five FFT filters when the target spreads over four Doppler filters.

FIG. 5 shows the frequency response of a filter formed by optimally combining five FFT filters when the target spreads over four Doppler filters.

The SNR can be written in terms of the co-variance matrix Q, the pure signal vector M and the vector of interpolation weights C as $$SNR = \frac{CM^2}{CQC^*}$$

where * denotes the adjoint.

Because Q is a hermitian matrix with positive eigenvalues, it may be written in the form $$Q = A^*A$$

Then $$SNR = \frac{CV_2}{CC^*}$$

where $$C' = CA^*$$

and $$V = (A^*)^{-1}M$$

The SNR is therefore maximized if $C' = V^*$. Thus, $$CA^* = M^* A^{-1}$$

$$C = M^* A^{-1}(A^*)^{-1}$$

$$C = M^* Q^{-1}$$

Figure 6:
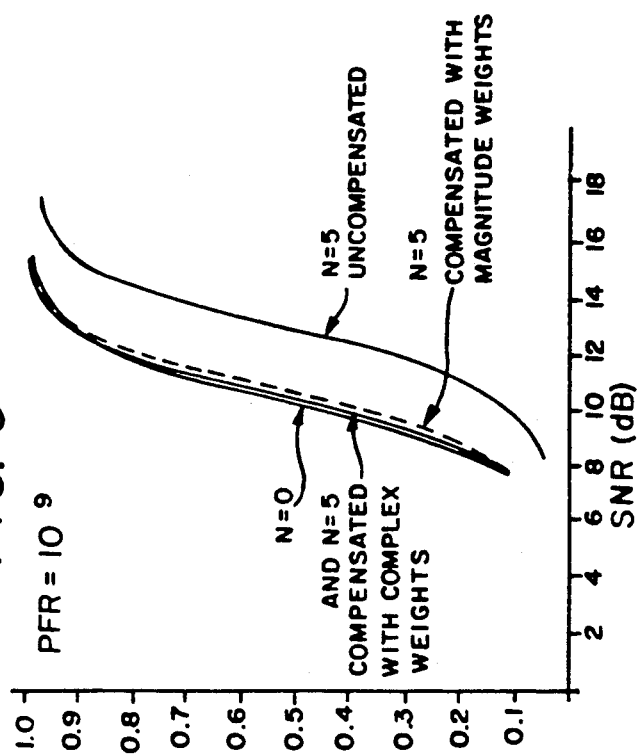
FIG. 6 shows the probability of detection as a function of signal-to-noise ratio for a target acceleration over five Doppler filters computed with a Monte Carlo simulation.

FIG. 6 shows the probability of detection as a function of signal-to-noise ratio for a target acceleration over 5 Doppler filters computed with a Monte Carlo simulation (FPA = $10^{-4}$). The Doppler at mid-array was centered in the middle filter. The case of zero acceleration and a uniformly distributed velocity across the Doppler filters is also shown (N=0). As can be seen, when compensated the probability of detection (PD) vs. SNR curve practically coincides with the detection curve of a target with zero acceleration and a velocity which is uniformly distributed over the width of one Doppler filter. This indicates a nearly perfect compensation. Additionally, the detection curve is shown for a compensation using only the magnitudes of the filter weights and the magnitude filter responses, instead of complex data. As shown, the resulting losses are very small (less than 0.1 db) relative to compensation with complex weights.

Figure 7:
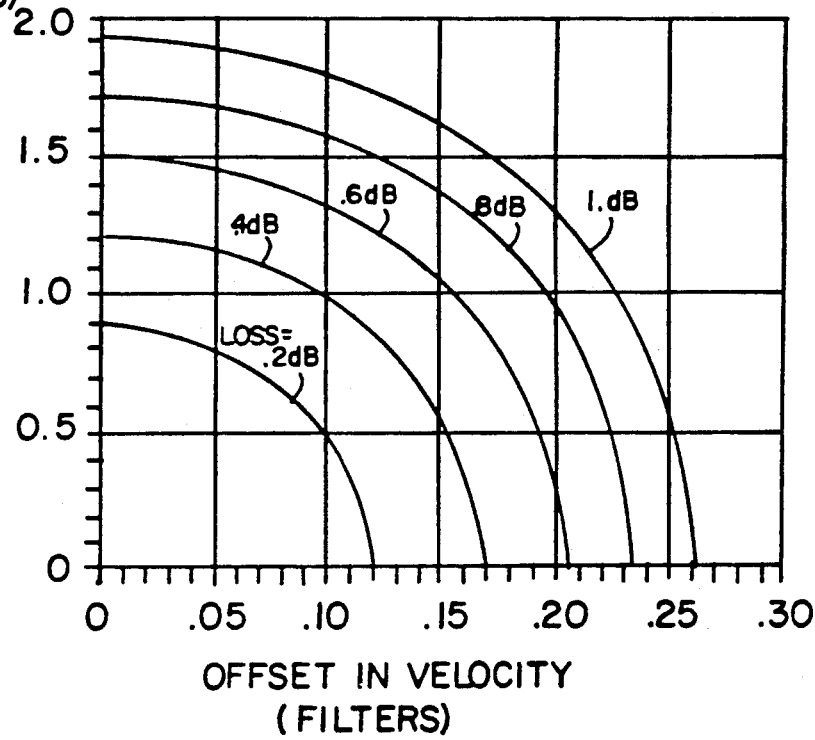
FIGS. 7 and 8 illustrate contours of constant loss from a matched case due to offsets in acceleration and velocity at array center.
Figure 8:
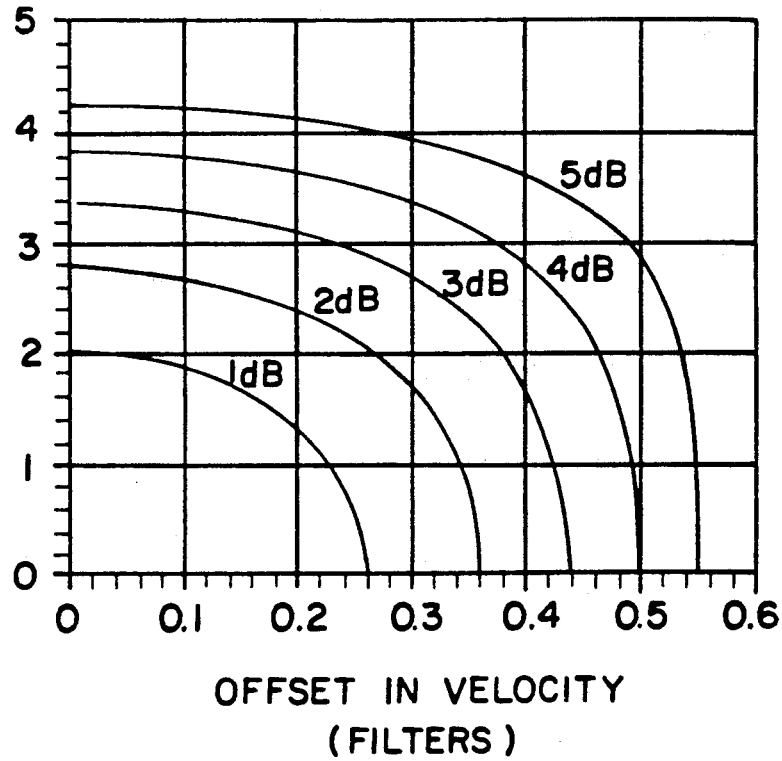

Contours of constant loss from a matched case due to offsets in acceleration and velocity at array center, are shown in FIGS. 7 and 8. These contours can be used to determine the amount of loss for the spacing of matched filters in Doppler and acceleration to be formed in the processor (smaller spacing results in smaller straddle or radar losses but higher processing requirements).

The study of acceleration compensation has shown that:
(i) Acceleration compensation for increments of two filters per each range-Doppler cell introduces negligible loss.
(ii) Use of Doppler filter magnitude data in the invention, which greatly reduces processor loading (50% or more depending on the acceleration), is nearly as effective as coherent acceleration compensation for the SNRs considered.

Acceleration compensation virtually eliminates losses due to acceleration. At lower SNRs magnitude compensation becomes less effective. However, coherent combination of Doppler filters may be used effectively.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A radar processor for compensating for target acceleration, which processor operates using range bins, for each range bin to be processed to provide target data, comprising:
   means for amplitude weighting the in-phase and quadrature component of radar signals;
   means for transforming the amplitude weighted radar signals into the frequency domain and forming a plurality of Doppler filters;

means for forming a plurality of acceleration filters matched to a predetermined set of target accelrations to process outputs of respective groups of said Doppler filters, each acceleration filter formed as the weighted combination of the outputs of said group of Doppler filters; and wherein the combination weights of each acceleration filter are precomputed to optimize the signal-to-noise ratio for each predetermined acceleration.

2. The radar processor claim 1 further characterized by a relatively long coherent array integration time so that the return energy from an accelerating target can spread over a plurality of Doppler filters, and wherein the number N of Doppler filters over which the energy spreads is given approximately by the relationship $$N = 2a\, T^2/\lambda$$

where a is the target acceleration, T is the coherent array time T, and $\lambda$ is the radar energy wavelength.

3. The radar processor of claim 1 further comprising means for magnitude detecting the output of each acceleration filter and comparing the magnitude of the output to a detection threshold to determine whether a target has been detected.

4. The radar processor of claim 1 further including means for magnitude detecting the outputs of the respective Doppler filters and comparing the magnitude of said signals to a detection threshold to detect non-accelerating targets.

5. The radar processor of claim 1 further comprising means for forming a plurality of deceleration filters matched to a predetermined set of target decelerations to process the outputs of respective groups of said Doppler filters, each deceleration filter formed as the weighted combination of the outputs of one of said groups of Doppler filters, wherein the combination weights of each deceleration filter are precomputed to optimize the signal-to-noise ratio for each predetermined deceleration.

6. The radar processor of claim 1 wherein said combination weights of each acceleration filter are based on the co-variance matrix between the Doppler filters being combined to form the acceleration filter.

7. The radar processor of claim 6 wherein said combination weights for an (N+1) filter acceleration are given by:

$$C_j = \sum_{i=0}^{N} (Q^{-1})_{ij}\, M_i^*$$

where $C_j$ is the $j^{th}$ filter weight; $M_i$ is the output of Doppler filter i for a signal centered at the frequency Doppler filter N/2; Q is the co-variance matrix between Doppler filters being combined; and "*" denotes the complex conjugate.

8. The radar processor of claim 7 wherein the acceleration filter centered at Doppler filter K is given by $$Y_k = \sum_{j=0}^{N} C_j\, X_{j+k-N/2}$$

where $X_i$ is the $i^{th}$ Doppler filter output.

9. The radar processor of claim 1 wherein the transforming means comprises means for performing a fast Fourier Transform operation.

10. A method for processing radar signals returned from a target to compensate for target acceleration, which processor operates using range bins, for each range bin to be processed to provide target data, comprising a sequence of the following steps:

amplitude weighting the in-phase and quadrature components of the returned radar signals;

transforming the amplitude weighted radar signals into the frequency domain and forming a plurality of Doppler filters; and forming a plurality of acceleration filters matched to a predetermined set of target accelerations to process outputs of respective groups of said Doppler filters, each filter formed as the weighted combination of the outputs of one said group of Doppler filters, wherein the combination weights of each filter bank are precomputed to optimize the signal-to-noise ratio for each predetermined acceleration.

11. The method of claim 10 further comprising the step of magnitude detecting the output of each acceleration filter and comparing the magnitude of the output to a detection threshold to determine whether a target has been detected.

12. The method of claim 10 further including the step of magnitude detecting the outputs of the respective Doppler filters and comparing the magnitude of said signals to a detection threshold to detect non-accelerating targets.

13. The method of claim 10 further comprising the steps of forming a plurality of deceleration filters matched to a predetermined set of target decelerations to process the outputs of respective groups of said Doppler filters, each filter formed as the weighted combination of the outputs of a respective one of said groups of Doppler filters, wherein the combination weights of each deceleration filter are precomputed to optimize the signal-to-noise ratio for each predetermined deceleration.

14. The method of claim 10 wherein said combination weights of each acceleration filter are based on the co-variance matrix between the Doppler filters being combined to form the acceleration filter.

15. The method of claim 14 wherein said combination weights for an (N+1) filter acceleration are given by:

$$C_j = \sum_{i=0}^{N} (Q^{-1})_{ij}\, M_i^*$$

where $C_j$ is the $j^{th}$ filter weight; $M_i$ is the output of Doppler filter i for a signal centered at the frequency of Doppler filter N/2; Q is the co-variance matrix between Doppler filters being combined; and "*" denotes the complex conjugate.

16. The method of claim 15 wherein the acceleration filter centered at Doppler filter K is given by $$Y_k = \sum_{j=0}^{N} C_j\, X_{j+k-N/2}$$

where $X_i$ is the $i^{th}$ Doppler filter output.

17. The method of claim 10 wherein said transforming step comprises performing a fast Fourier Transform of the amplitude weighted, received radar signals.

18. The method of claim 10 wherein the method is used to process radar return signals in a radar characterized by relatively long coherent array integration times so that the return energy from an accelerating target can spread over a plurality of Doppler filters, and wherein the number N of Doppler filters over which the energy spreads is given approximately by the relationship $$N = 2a\, T^2/\lambda$$

where a is the target acceleration, T is the coherent array time T, and λ is the radar energy wavelength.

* * * * *